(12) United States Patent
Lee

(10) Patent No.: US 12,188,849 B2
(45) Date of Patent: Jan. 7, 2025

(54) CONTROL SURFACE LOAD SIMULATION APPARATUS HAVING REACTION FORCE PROVIDING STRUCTURE

(71) Applicant: KOREA AEROSPACE RESEARCH INSTITUTE, Daejeon (KR)

(72) Inventor: Jung Jin Lee, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 95 days.

(21) Appl. No.: 17/811,355

(22) Filed: Jul. 8, 2022

(65) Prior Publication Data

US 2023/0014817 A1 Jan. 19, 2023

(30) Foreign Application Priority Data

Jul. 15, 2021 (KR) .................. 10-2021-0093142

(51) Int. Cl.
*G01M 5/00* (2006.01)
*B64F 5/60* (2017.01)

(52) U.S. Cl.
CPC ............. *G01M 5/0016* (2013.01); *B64F 5/60* (2017.01); *G01M 5/005* (2013.01)

(58) Field of Classification Search
CPC ............................ G01M 5/005; G01M 5/0016
See application file for complete search history.

(56) References Cited

U.S. PATENT DOCUMENTS 9,828,084 B2 * 11/2017 Golshany .................. B64C 1/26
10,864,608 B2 * 12/2020 Lurie ........................ B23Q 3/16
2019/0262956 A1 8/2019 Lurie et al.

FOREIGN PATENT DOCUMENTS

| CN | 205228807 U | * | 5/2016 |
| CN | 215257564 U | * | 12/2021 |
| KR | 101371519 | | 3/2014 |
| KR | 20200125676 | | 11/2020 |

* cited by examiner

*Primary Examiner* — Courtney D Heinle
*Assistant Examiner* — John S Hunter, Jr.
(74) *Attorney, Agent, or Firm* — Perman & Green, LLP

(57) ABSTRACT

Provided is a control surface load simulation apparatus including a reaction force providing structure. The control surface load simulation apparatus includes a first support surface, a second support surface apart from the first support surface in a height direction, a control surface located between the first support surface and the second support surface, an actuator connected to the second support surface and configured to apply a certain load to the control surface, and a reaction force providing structure connected to the first support surface and the control surface to be movable relative to the first support surface and the control surface, the reaction force providing structure being configured to apply a reaction force corresponding to the load to the control surface.

3 Claims, 10 Drawing Sheets

CONTROL SURFACE LOAD SIMULATION APPARATUS HAVING REACTION FORCE PROVIDING STRUCTURE

CROSS-REFERENCE TO RELATED APPLICATION

This application is based on and claims priority under 35 U.S.C. § 119 to Korean Patent Application No. 10-2021-0093142, filed on Jul. 15, 2021, in the Korean Intellectual Property Office, the disclosure of which is incorporated by reference herein in its entirety.

BACKGROUND

1. Field

One or more embodiments relate to an apparatus (hereinafter referred to as a control surface load simulation apparatus) for simulating a load applied to a control surface, and more particularly, to a control surface load simulation apparatus having a reaction force providing structure.

2. Description of the Related Art

A control surface refers to an aircraft apparatus that controls the direction and attitude of an aircraft. The control surface includes an aileron, an elevator, a rudder, or the like as a primary control surface, and includes a flap, a leading edge, a spoiler, or the like as a secondary control surface.

Because the control surface greatly affects the performance of the aircraft, it is important to predict the flight suitability and response characteristics of a control surface actuator by simulating a load applied to the control surface during actual operation. To this end, a control surface load simulation apparatus is used.

As shown in FIG. 1, an existing control surface load simulation apparatus includes one actuator in each of an upper portion and a lower portion, and applies a tensile load and a compressive load to a control surface through the actuator to simulate a load applied to the control surface.

In the existing control surface load simulation apparatus, because two actuators operate simultaneously, a deviation may occur in the compressive load and tensile load applied to the control surface by each actuator. For this reason, it is necessary to pre-verify an algorithm or program that applies the loads, and care is needed to prevent damage to a test specimen during testing due to a load deviation.

In addition, there is a method of replacing one of the two actuators by applying a pre-tension or compressive load by using a spring, but there is a problem in that the rigging of the spring is cumbersome and the accuracy is lowered.

The above-mentioned background art is technical information that the inventor possessed to derive the present disclosure or acquired in the process of deriving the present disclosure, and it cannot be said that the background art is necessarily a known technique disclosed to the general public before the filing of the present disclosure.

SUMMARY

One or more embodiments include a control surface load simulation apparatus that may easily apply and correct a load to a control surface by replacing one of two actuators connected to the control surface with a reaction force providing structure using a compression spring.

However, the above-described objective is an example, and is not limited thereto.

Additional aspects will be set forth in part in the description which follows and, in part, will be apparent from the description, or may be learned by practice of the presented embodiments of the disclosure.

According to one or more embodiments, the control surface load simulation apparatus includes a first support surface, a second support surface disposed to be apart from the first support surface in a height direction, a control surface disposed between the first support surface and the second support surface, an actuator connected to the second support surface and applying a certain load to the control surface, and a reaction force providing structure connected to the first support surface and the control surface to be movable relative to the first support surface and the control surface, the reaction force providing structure applying a reaction force corresponding to the load to the control surface.

The reaction force providing structure may include a plurality of springs, and when the actuator applies a certain load to the control surface, the reaction force providing structure may be compressed or tensioned accordingly to apply a reaction force corresponding to the load to the control surface.

The reaction force providing structure may include a pair of stators and a mover moving between the pair of stators, and one or more springs respectively disposed between the pair of stators and the mover may be compressed or tensioned according to displacement of the control surface.

The reaction force providing structure may include a first stator rotatably connected to the first support surface, a second stator disposed to be apart from the first stator, at least one linear guide disposed between the first stator and the second stator, a main mover moving along the at least one linear guide, a movement guide connected to the control surface and the main mover to move the main mover according to displacement of the control surface, a fixed guide having one end fixed to the first stator and the other end inserted into the movement guide, a first spring disposed on an outer circumferential surface of the fixed guide, and a second spring disposed on an outer circumferential surface of the movement guide.

The movement guide may have one end rotatably connected to the control surface and the other end connected to the main mover, and may pass through the second stator.

The fixed guide may pass through the main mover and be inserted into an inner space of the movement guide, which is a hollow.

When the movement guide presses the main mover toward the first stator, the first spring may be compressed and the second spring may be released, and when the movement guide presses the main mover toward the second stator, the first spring may be in a free state and the second spring may be compressed.

The reaction force providing structure may further include a first sub-mover disposed between the first stator and the main mover and moving along the linear guide, and a third spring disposed between the first stator and the main mover and disposed on an outer circumferential surface of the fixed guide, wherein the first spring may be disposed between the main mover and the first sub-mover.

The first spring and the third spring may have different elastic moduli.

The reaction force providing structure may further include a second sub-mover disposed between the second stator and the main mover and moving along the linear guide, and a fourth spring disposed between the second stator and the main mover and disposed on an outer circumferential surface of the movement guide, wherein the second spring may be disposed between the main mover and the second sub-mover.

The second spring and the fourth spring may have different elastic moduli.

Other aspects, features, and advantages other than those described above will become apparent from the accompanying drawings, the appended claims, and the detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
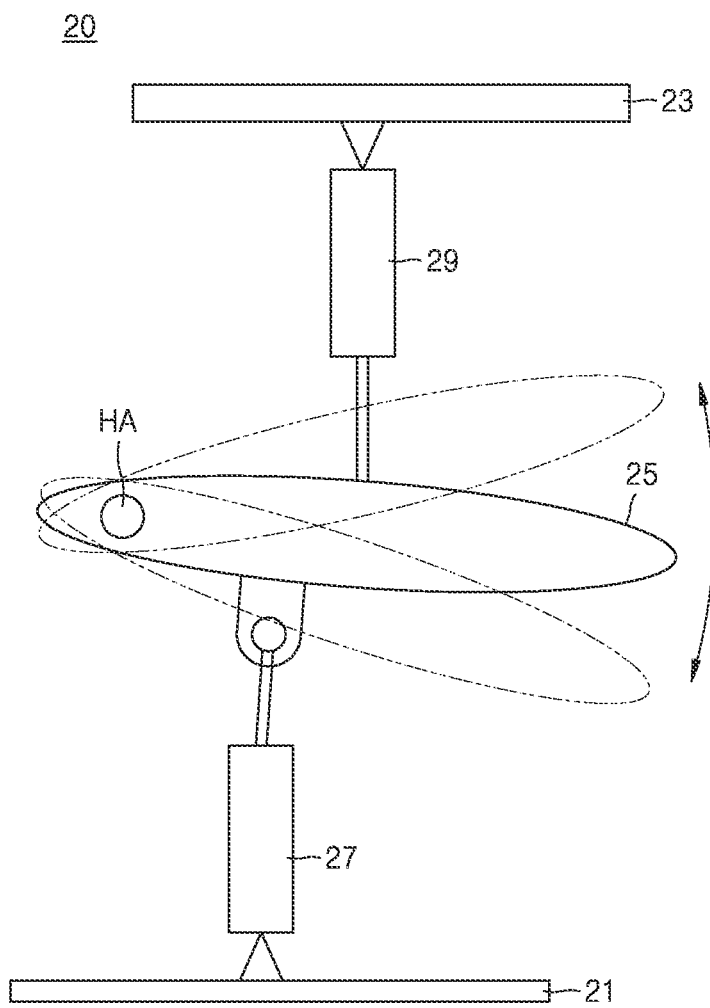
FIG. 1 illustrates an existing control surface load simulation apparatus.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, even though illustrated with respect to different embodiments, the same reference numerals are used for the same components.

Hereinafter, embodiments of the present disclosure will be described in detail with reference to the accompanying drawings, and when described with reference to the drawings, the same or corresponding components are given the same reference numerals, and repeated description thereof will be omitted.

It will be understood that although the terms "first", "second", etc. may be used herein to describe various components, these components should not be limited by these terms. These components are only used to distinguish one component from another.

An expression used in the singular form encompasses the expression in the plural form, unless it has a clearly different meaning in the context.

In the present specification, it is to be understood that the terms such as "including" or "having" are intended to indicate the existence of the features or components disclosed in the specification, and are not intended to preclude the possibility that one or more other features or components may be added.

Also, in the drawings, for convenience of description, sizes of elements may be exaggerated or contracted. For example, since sizes and thicknesses of components in the drawings are arbitrarily illustrated for convenience of explanation, the following embodiments are not limited thereto.

In the embodiments below, an x-axis, a y-axis, and a z-axis are not limited to three axes on a rectangular coordinates system but may be construed as including these axes. For example, an x axis, a y-axis, and a z-axis may be at right angles or may also indicate different directions from one another, which are not at right angles.

When an embodiment is implementable in another manner, a predetermined process order may be different from a described one. For example, two processes that are consecutively described may be substantially simultaneously performed or may be performed in an opposite order to the described order.

The terms used in the present specification are merely used to describe particular embodiments, and are not intended to limit the present disclosure. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 2:
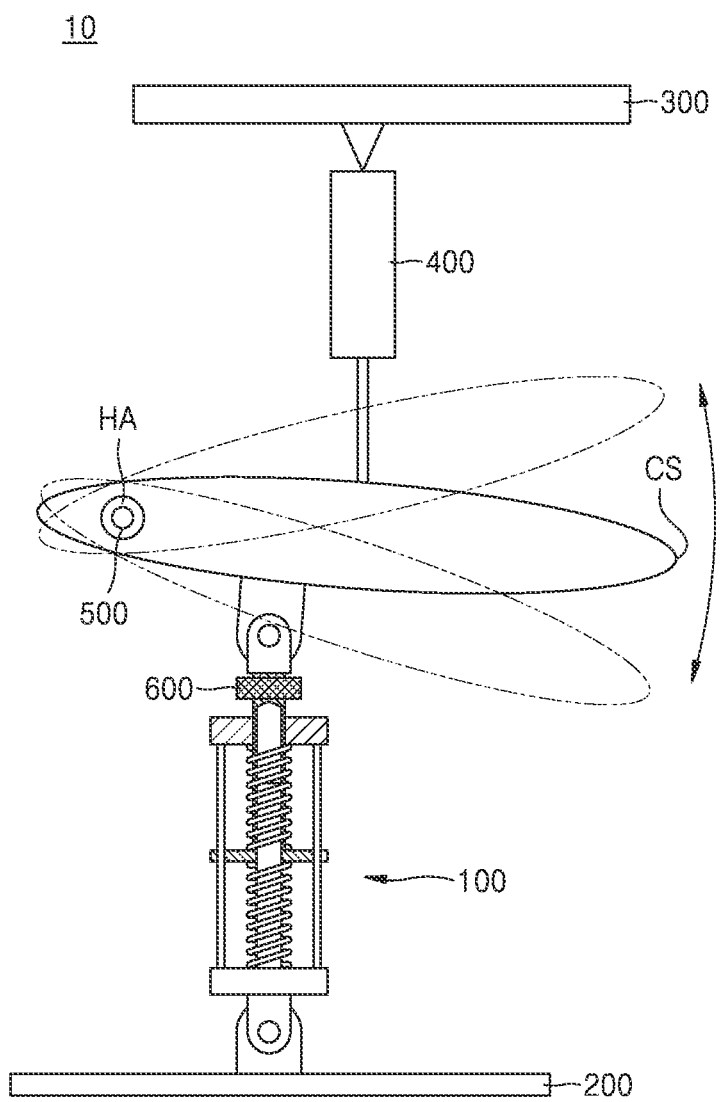
FIG. 2 illustrates a control surface load simulation apparatus according to an embodiment of the present disclosure.
Figure 3:
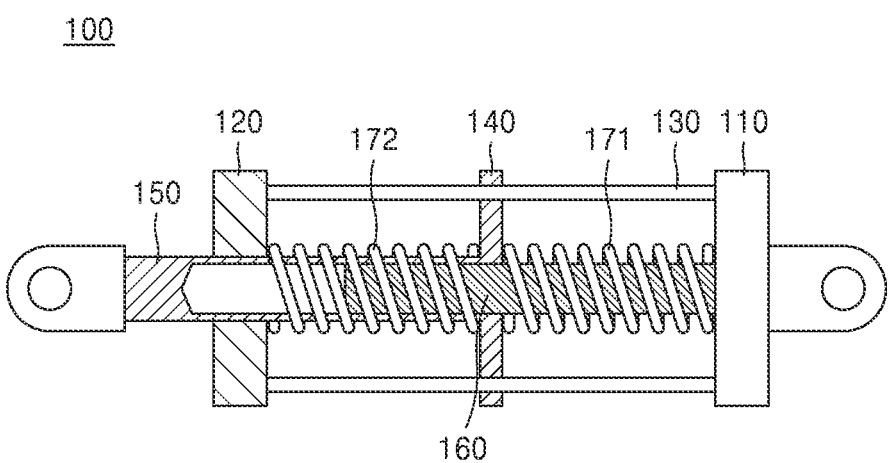
FIGS. 3 to 5 illustrate a reaction force providing structure according to an embodiment of the present disclosure.
Figure 4:
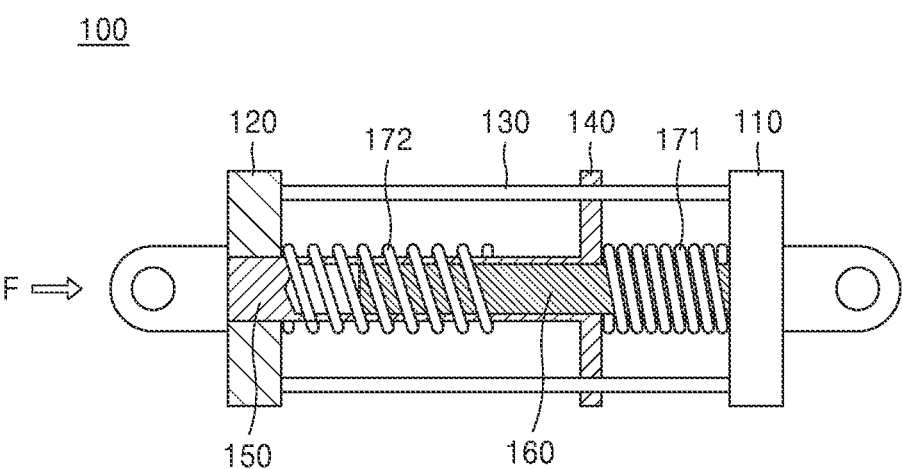
Figure 5:
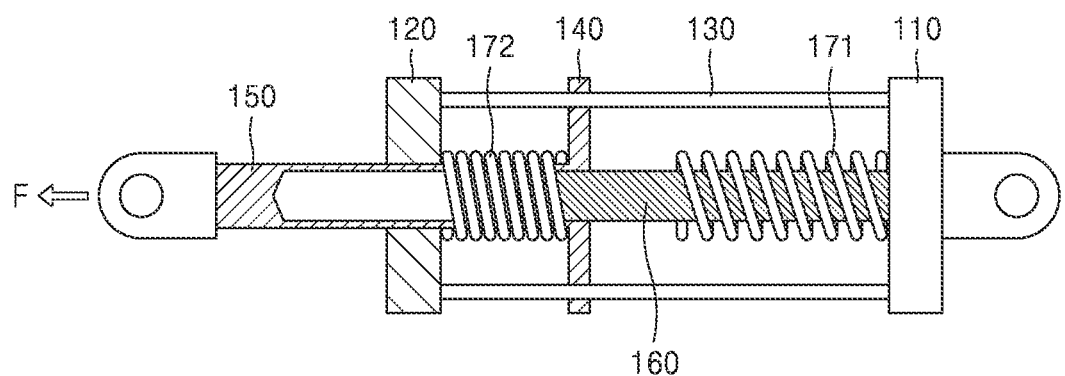

FIG. 1 illustrates an existing control surface load simulation apparatus 20, FIG. 2 illustrates a control surface load simulation apparatus 10 according to an embodiment of the present disclosure, and FIGS. 3 to 5 illustrate a reaction force providing structure 100 according to an embodiment of the present disclosure.

As shown in FIG. 1, the existing control surface load simulation apparatus 20 includes a pair of support surfaces 21 and 23, a control surface 25 disposed between the pair of support surfaces 21 and 23, and a pair of actuators 27 and 29 connecting the pair of support surfaces 21 and 23 to the control surface 25.

The pair of actuators 27 and 29 applies a load to the control surface 25 according to a user's instruction input through a controller or according to a preset program. The control surface 25 to which the load is applied is located between an up position and a down position while rotating about a hinge axis HA.

However, it is very difficult to perfectly match the magnitudes or timings of loads applied to the control surface 25 by the pair of actuators 27 and 29, and thus, a deviation occurs in the loads during a load application test process.

The control surface load simulation apparatus 10 according to an embodiment of the present disclosure is a device for solving such a problem, and includes a control surface CS, a reaction force providing structure 100, a first support surface 200, a second support surface 300, and an actuator 400.

The control surface CS may be a lift generating apparatus that determines the flight attitude of an aircraft by generating three-axis motion (yaw axis, roll axis, and pitch axis motion) of the aircraft or a replica of the lift generating apparatus. The type of the control surface CS is not particularly limited, and may be a main control surface such as an aileron, an elevator, or a rudder, a secondary control surface such as a spoiler, a flap, a slat, or an air brake, or any one of a trim tab and a balance tab.

The position or operation relationship of the control surface CS is not particularly limited. In an embodiment, the control surface CS may be disposed on one side of the control surface load simulation apparatus 10 so as to be rotatable about a hinge axis HA according to the operation of the actuator 400. That is, the control surface CS may rotate on a plane about the hinge axis HA.

When the actuator 400, which will be described below, operates to apply a certain load to the control surface CS, the reaction force providing structure 100 applies a reaction force corresponding to the load to the control surface CS. The reaction force providing structure 100 will be described below.

The first support surface 200 is connected to one side of the reaction force providing structure 100. The first support surface 200 may be disposed on the ground or disposed on a fixed structure. In an embodiment, the first support surface 200 may include a connection portion so that the reaction force providing structure 100 is movable relative to the first support surface 200. More specifically, the first support surface 200 may be hinged with one end of the reaction force providing structure 100. Accordingly, when the control surface CS is moved by the actuator 400, the reaction force providing structure 100 connected to the control surface CS may also rotate with respect to the first support surface 200.

The second support surface 300 is disposed to be apart from the first support surface 200 in a height direction. The second support surface 300 may be disposed on one side of the control surface load simulation apparatus 10 through a support frame (not shown). In an embodiment, the actuator 400 may be connected to one side, for example, a lower surface, of the second support surface 300.

The actuator 400 applies a load to the control surface CS while being connected to one side of the second support surface 300. The actuator 400 may receive a user's instruction by wire/wirelessly through a controller or the like and apply a load to the control surface CS. Alternatively, the actuator 400 may apply a load to the control surface CS according to a preset program.

The type of the actuator 400 is not particularly limited, and an apparatus capable of applying a load to the control surface CS is sufficient. For example, the actuator 400 may mechanically apply a load to the control surface CS through a rotating shaft, a torsion beam, or the like. Alternatively, the actuator 400 may apply a load to the control surface CS as a hydraulic apparatus.

As shown in FIG. 2, one end of the actuator 400 may be connected to the second support surface 300, and the other end may be connected to the control surface CS. The other end of the actuator 400 may apply a load to the control surface CS while a portion connected to the control surface CS moves.

Referring to FIGS. 2 and 3, the reaction force providing structure 100 according to an embodiment of the present disclosure may generate a reaction force corresponding to a load applied to the control surface CS by the actuator 400. For example, the reaction force providing structure 100 includes a plurality of springs, and when the actuator 400 applies a certain load to the control surface CS, the reaction force providing structure 100 is compressed or tensioned accordingly to apply (i.e., provide) a reaction force corresponding to the load to the control surface CS.

In an embodiment, the control surface load simulation apparatus 10 may further include a potentiometer 500 and a load cell 600. As shown in FIG. 2, the potentiometer 500 may be disposed on the hinge axis HA of the control surface CS. When the control surface load simulation apparatus 10 applies a load to the control surface CS, the potentiometer 500 may measure the angular displacement of the control surface CS and check and control a rotation angle of the control surface CS according to the load applied to the control surface CS.

In another embodiment, the control surface load simulation apparatus 10 may include a linear displacement gauge (not shown) instead of the potentiometer 500. The linear displacement gauge may be disposed on one side of the control surface CS, and when the control surface load simulation apparatus 10 applies a load to the control surface CS, the linear displacement gauge may measure the linear displacement of the control surface CS and check and control the position of the control surface CS according to the load applied to the control surface CS.

In addition, the load cell 600 may be disposed in a connection portion between the control surface CS and the reaction force providing structure 100 or in the reaction force providing structure 100. More specifically, the load cell 600 may be disposed in a movement guide 150 of the reaction force providing structure 100. The load cell 600 may sense the magnitude of a reaction force generated by the reaction force providing structure 100.

Through this, the control surface load simulation apparatus 10 may set a criterion for stopping a test when the test proceeds differently from an expected scenario (for example, when the magnitude of the reaction force generated by the reaction force providing structure 100 exceeds a preset range, or when unexpected deformation occurs in the control surface CS or the like) during a load simulation test.

In an embodiment, the reaction force providing structure 100 includes a pair of stators and a mover moving between the pair of stators, and one or more springs disposed between the pair of stators and the mover may be compressed or tensioned according to the displacement of the control surface CS.

For example, when the actuator 400 presses down the control surface CS, the mover moves downward (e.g., in a right direction in FIG. 3) between the pair of stators, and accordingly, a spring between the mover and one stator is compressed and generates a reaction force. Conversely, when the actuator 400 pulls the control surface CS upward, the mover moves upward (e.g., in a left direction in FIG. 3) between the pair of stators, and accordingly, a spring between the mover and the other stator is compressed and generates a reaction force.

In an embodiment, the reaction force providing structure 100 may include a first stator 110, a second stator 120, a linear guide 130, a main mover 140, a movement guide 150, a fixed guide 160, a first spring 171, and a second spring 172.

The first stator 110 may be connected to the first support surface 200. For example, as shown in FIGS. 2 and 3, a connection portion connected to the first support surface 200 may protrude from one side of the first stator 110. The connection portion may be connected to the first support surface 200 through a pin or the like, and through this, the first stator 110 may be rotatably connected to the first support surface 200.

The first stator 110 and the first support surface 200 are not necessarily connected to each other through a hinge, but may be connected to each other through a ball joint or the like. However, hereinafter, a case, in which similarly to the operation of the control surface CS, the first stator 110 and the first support surface 200 are connected to each other through a hinge, and accordingly, the first stator 110 also rotates on the same plane as the control surface CS, will be mainly described.

The second stator 120 is disposed to be apart from the first stator 110, and the linear guide 130, the main mover 140, the first spring 171, the second spring 172, and the like, which will be described below, may be disposed between the first stator 110 and the second stator 120.

In an embodiment, the second stator 120 has an insertion hole, and the movement guide 150 to be described below may be inserted into the second stator 120 through the insertion hole.

The shapes and sizes of the first stator 110 and the second stator 120 are not particularly limited. For example, the first stator 110 and the second stator 120 may be polygonal flat plates. Hereinafter, for convenience of description, a case in which the first stator 110 and the second stator 120 have disk shapes will be mainly described.

At least one linear guide 130 may be disposed between the first stator 110 and the second stator 120. The linear guide 130 is a linear member having one end connected to the first stator 110 and the other end connected to the second stator 120, and functions as a guide through which the main mover 140 to be described below moves.

In an embodiment, three linear guides 130 may be arranged, and these linear guides 130 may be arranged to form an equal angle (e.g., 120 degrees) with respect to the central axis of the reaction force providing structure 100.

The main mover 140 is disposed between the first stator 110 and the second stator 120 and moves along the linear guide 130. The main mover 140 has one side into which the linear guide 130 is inserted, and may have a circular plate or polygonal plate shape.

In an embodiment, one side of the main mover 140 may be connected to the movement guide 150 to be described below. Accordingly, when the actuator 400 operates and the movement guide 150 to be described below moves, the main mover 140 also moves in the same direction. In addition, a spring between the main mover 140 and the first stator 110 or the second stator 120 may be compressed to generate a reaction force.

In another embodiment, the main mover 140 may be formed integrally with the movement guide 150. That is, an end of the movement guide 150 is formed to have a flat plate shape, and a corresponding portion may perform the function of the main mover 140.

The movement guide 150 is a rod-shaped member and compresses the spring while moving according to the displacement of the control surface CS. For example, one end of the movement guide 150 is connected to the control surface CS, and the other end is connected to the main mover 140. Accordingly, when movement occurs in the control surface CS, the movement guide 150 moves, the main mover 140 also moves in the same direction, and the first spring 171 or the second spring 172 is compressed.

In an embodiment, the movement guide 150 may be inserted through an insertion hole of the second stator 120. The insertion hole may be formed parallel to a longitudinal direction of the movement guide 150 and/or the central axis of the reaction force providing structure 100. Accordingly, the insertion hole may guide the movement guide 150 to move in a straight line.

In an embodiment, the movement guide 150 may be connected to the control surface CS to be movable relative to the control surface CS. For example, as shown in FIG. 3, one end of the movement guide 150 may be hinged to the control surface CS through a pin or the like. Accordingly, when displacement occurs in the control surface CS, the movement guide 150 rotates around the pin, and the main mover 140 connected to the other end of the movement guide 150 moves and compresses the spring.

In an embodiment, the movement guide 150 may have an inner space that is a hollow. A portion of the fixed guide 160 may be inserted into the inner space. The movement guide 150 may move while the fixed guide 160 is inserted therein.

The fixed guide 160 is a rod-shaped member, and one end of the fixed guide 160 may be connected to the first stator 110 and the other end may be inserted into the inner space of the movement guide 150. Also, the fixed guide 160 may pass through an insertion hole formed in the main mover 140 and be inserted into the inner space of the movement guide 150.

The first spring 171 may be disposed on the outer circumferential surface of the fixed guide 160. For example, as shown in FIG. 3, the first spring 171 is disposed between the first stator 110 and the main mover 140, and may maintain a state in which the first spring 171 is wound around the outer circumferential surface of the fixed guide 160. Accordingly, when the main mover 140 moves toward the first stator 110, the main mover 140 moves along the linear guide 130 and the fixed guide 160 to compress the first spring 171.

In an embodiment, both ends of the first spring 171 are not fixed to the first stator 110 and the main mover 140. That is, both ends of the first spring 171 may be free ends.

The second spring 172 may be disposed on the outer circumferential surface of the movement guide 150. For example, as shown in FIG. 3, the second spring 172 is disposed between the second stator 120 and the main mover 140, and may maintain a state in which the second spring 172 is wound around the outer circumferential surface of the movement guide 150. Accordingly, when the main mover 140 moves toward the second stator 120, the main mover 140 moves along the linear guide 130 and the movement guide 150 to compress the second spring 172.

In an embodiment, both ends of the second spring 172 are not fixed to the second stator 120 and the main mover 140. That is, both ends of the second spring 172 may be free ends.

In an embodiment, the elastic modulus of the first spring 171 may be the same as that of the second spring 172. Alternatively, the first spring 171 and the second spring 172 may have different elastic moduli, and thus may form different reaction forces when the control surface CS receives a compressive load and a tensile load, respectively.

An operating state of the control surface load simulation apparatus 10 according to an embodiment of the present disclosure will be described with reference to FIGS. 3 to 5.

In a state in which the actuator 400 does not operate, that is, in a neutral state with no change in the position of the control surface CS, the first spring 171 and the second spring 172 maintain a static equilibrium state in which no force is applied thereto.

Next, when the actuator 400 operates to press the control surface CS downward, the movement guide 150 of the reaction force providing structure 100 moves downward (e.g., in a right direction in FIG. 4). Accordingly, as the main mover 140 connected to the movement guide 150 moves toward the first stator 110, the first spring 171 wound around the fixed guide 160 is compressed to form a reaction force.

In this case, the second spring 172 is only wound around the outer circumferential surface of the movement guide 150, and is not fixed to the second stator 120 or the main mover 140. Therefore, even when the main mover 140 moves, the second spring 172 is not compressed or tensioned. That is, the displacement of the second spring 172 does not change.

Next, when the actuator 400 operates to tension the control surface CS upward, the movement guide 150 of the reaction force providing structure 100 moves upward (e.g., in a left direction of FIG. 5). Accordingly, as the main mover 140 connected to the movement guide 150 moves toward the second stator 120, the second spring 172 wound around the movement guide 150 is compressed to form a reaction force.

In this case, the first spring 171 is only wound around the outer circumferential surface of the fixed guide 160, and is not fixed to the first stator 110 or the main mover 140. Therefore, even when the main mover 140 moves, the first spring 171 is not compressed or tensioned. That is, the displacement of the first spring 171 does not change.

Through such a configuration, the control surface load simulation apparatus 10 according to an embodiment of the present disclosure may simulate a compressive load and a tensile load, applied to the control surface CS, by using only one actuator 400.

In particular, as the control surface load simulation apparatus 10 according to an embodiment of the present disclosure includes the reaction force providing structure 100 that generates a reaction force with respect to a load applied by one actuator 400 to the control surface CS, there is no need to synchronize the timings and magnitudes of loads applied by a plurality of actuators 400. In addition, the reaction force providing structure 100 including a plurality of springs may generate a reaction force while responding immediately according to the displacement of the control surface CS.

Therefore, the control surface load simulation apparatus 10 according to an embodiment of the present disclosure may accurately simulate a control surface load even with a relatively simple configuration, and maintenance and repair of the control surface load simulation apparatus 10 are very easy.

Figure 6:
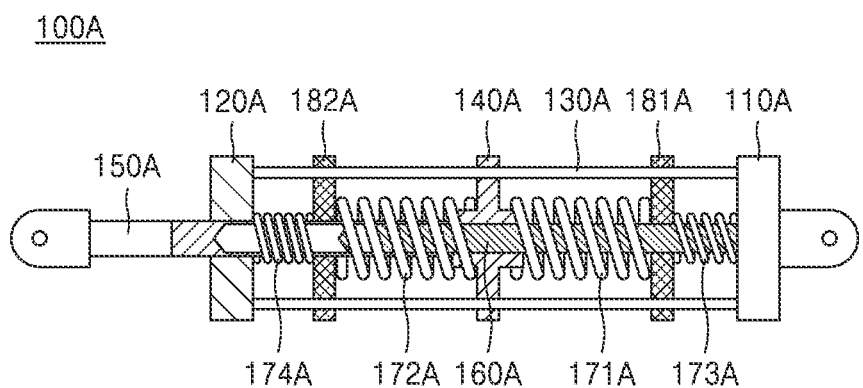
FIGS. 6 to 8 illustrate a reaction force providing structure according to another embodiment of the present disclosure.
Figure 7:
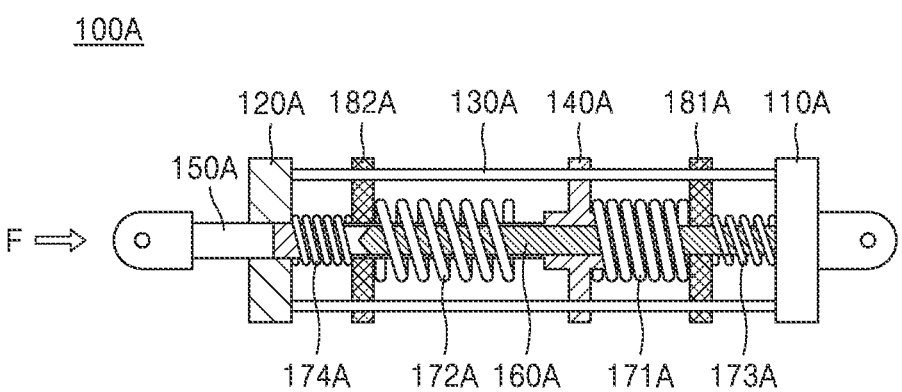
Figure 8:
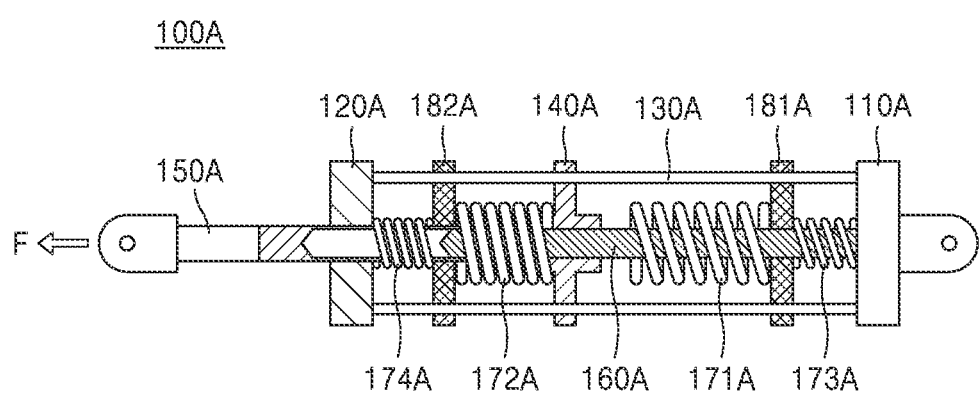

FIGS. 6 to 8 illustrate a reaction force providing structure 100A according to another embodiment of the present disclosure.

The control surface load simulation apparatus 10 according to an embodiment of the present disclosure may include the reaction force providing structure 100A. The reaction force providing structure 100A may further include a plurality of sub-movers and springs, as compared to the reaction force providing structure 100 according to the above-described embodiment. Other components of the reaction force providing structure 100A may be the same as other components of the reaction force providing structure 100, and detailed descriptions thereof are omitted.

As shown in FIGS. 6 to 8, the reaction force providing structure 100A according to the present embodiment may further include a first sub-mover 181A, a second sub-mover 182A, a third spring 173A, and a fourth spring 174A.

The first sub-mover 181A is disposed between a first stator 110A and a main mover 140A, and moves along a linear guide 130A. The first sub-mover 181A is a circular or polygonal flat plate similar to the main mover 140A, and the linear guide 130A passes through the first sub-mover 181A along the edge thereof and a fixed guide 160A passes through the inside of the first sub-mover 181A.

In an embodiment, the first sub-mover 181A may divide an area between the first stator 110A and the main mover 140A. For example, a first spring 171A may be disposed between the first sub-mover 181A and the main mover 140A, and the third spring 173A may be disposed between the first sub-mover 181A and the first stator 110A.

Each of the first spring 171A and the third spring 173A may be wound around the outer circumferential surface of a fixed guide 160A, and both ends of each of the first spring 171A and the third spring 173A may be free ends that are not fixed.

Accordingly, as shown in FIG. 7, when a movement guide 150A presses the main mover 140A toward the first stator 110A, the first spring 171A positioned between the main mover 140A and the first sub-mover 181A is compressed while the main mover 140A moves along the fixed guide 160A. At the same time, the third spring 173A positioned between the first sub-mover 181A and the first stator 110A may also be compressed, thereby generating a reaction force against a load applied to a control surface CS by an actuator 400.

In an embodiment, the first spring 171A and the third spring 173A may have different elastic moduli. For example, the first spring 171A may have an elastic modulus k1, and the third spring 173A may have an elastic modulus k3. Accordingly, when the main mover 140A compresses the first spring 171A and the third spring 173A with a force F, the total displacement δ satisfies δ1+δ3 (δ1=F/k1, and δ3=F/k3).

When the main mover 140A presses the first sub-mover 181A toward the first stator 110A, the second sub-mover 182A does not move, and the displacement of a second spring 172A and the displacement of the fourth spring 174A do not change.

The second sub-mover 182A is disposed between the second stator 120A and the main mover 140A, and moves along the linear guide 130A. The second sub-mover 182A may have the same shape as or a different shape from the first sub-mover 181A, and the linear guide 130A passes through the second sub-mover 182A along the edge thereof and the movement guide 150A passes through the inside of the second sub-mover 182A.

In an embodiment, the second sub-mover 182A may divide an area between the second stator 120A and the main mover 140A. For example, the second spring 172A may be disposed between the second sub-mover 182A and the main mover 140A, and the fourth spring 174A may be disposed between the second sub-mover 182A and the second stator 120A.

Each of the second spring 172A and the fourth spring 174A may be wound around the outer circumferential surface of the movement guide 150A, and both ends of each of the second spring 172A and the fourth spring 174A may be free ends that are not fixed.

Accordingly, as shown in FIG. 8, when the movement guide 150A pulls the main mover 140A toward the second stator 120A, the second spring 172A positioned between the main mover 140A and the second sub-mover 182A is compressed while the main mover 140A moves along the movement guide 150A. At the same time, the fourth spring 174A positioned between the second sub-mover 182A and the second stator 120A may also be compressed, thereby generating a reaction force against a load applied to the control surface CS by the actuator 400.

In an embodiment, the second spring 172A and the fourth spring 174A may have different elastic moduli. For example, the second spring 172A may have an elastic modulus k2, and the fourth spring 174A may have an elastic modulus k4. Accordingly, when the main mover 140A presses the second spring 172A and the fourth spring 174A with a force F, the total displacement δ satisfies δ2+δ4 (δ2=F/k2, and δ4=F/k4).

When the main mover 140A pulls the second sub-mover 182A toward the second stator 120A, the first sub-mover 181A does not move, and the displacement of the first spring 171A and the displacement of the third spring 173A do not change.

In an embodiment, the first spring 171A and the second spring 172A may have the same elastic modulus, and the third spring 173A and the fourth spring 174A may have the same elastic modulus.

As described above, the control surface load simulation apparatus 10 according to the present embodiment includes the reaction force providing structure 100A including two stages, and thus may more precisely provide a reaction force according to the displacement of the control surface CS. Therefore, the control surface load simulation apparatus 10 may more precisely simulate a load applied to the control surface CS.

Figure 9:
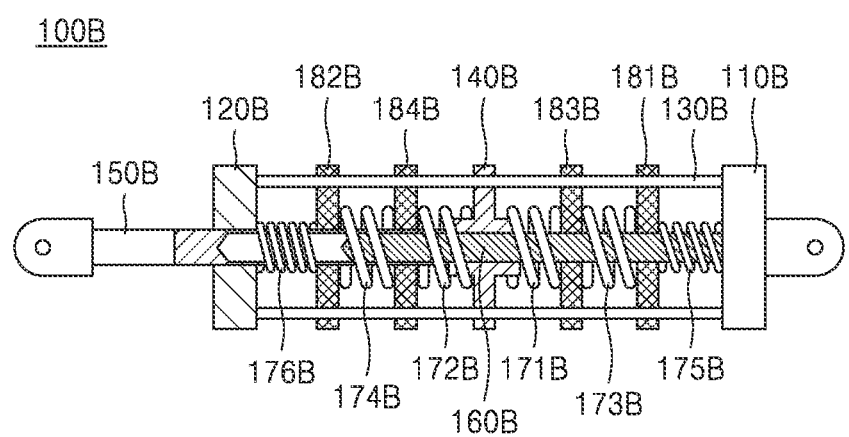
FIG. 9 illustrates a reaction force providing structure according to another embodiment of the present disclosure.

FIG. 9 illustrates a reaction force providing structure 100B according to another embodiment of the present disclosure.

The control surface load simulation apparatus 10 according to the present embodiment may include the reaction force providing structure 100B. The reaction force providing structure 100B may further include a plurality of sub-movers and springs, as compared to the reaction force providing structure 100A according to the above-described embodiment. Other components of the reaction force providing structure 100B may be the same as other components of the reaction force providing structure 100A, and detailed descriptions thereof are omitted.

As shown in FIG. 9, the reaction force providing structure 100B according to the present embodiment may further include a third sub-mover 183B, a fourth sub-mover 184B, a fifth spring 175B, and a sixth spring 176B.

The third sub-mover 183B is disposed between a first stator 110B and a first sub-mover 181B, and moves along a linear guide 130B. The third sub-mover 183B has the same shape as or a different shape from the first sub-mover 181B, and the linear guide 130B passes through the third sub-mover 183B along the edge thereof and a fixed guide 160B passes through the inside of the third sub-mover 183B.

In an embodiment, the third sub-mover 183B may divide an area between the first sub-mover 181B and the first stator 110B. For example, the first sub-mover 181B, the third sub-mover 183B, and the first stator 110B may be sequentially disposed along the right side of a main mover 140B. Also, a first spring 171B may be disposed between the main mover 140B and the first sub-mover 181B, a third spring 173B may be disposed between the first sub-mover 181B and the third sub-mover 183B, and a fifth spring 175B may be disposed between the third sub-mover 183B and the first stator 110B.

The first spring 171B, the third spring 173B, and the fifth spring 175B are each wound around the outer circumferential surface of the fixed guide 160B, and both ends of each spring may be free ends that are not fixed.

Accordingly, as shown in FIG. 9, when a movement guide 150B presses the main mover 140B toward the first stator 110B, the first spring 171B positioned between the main mover 140B and the first sub-mover 181B is compressed while the main mover 140B moves along the fixed guide 160B. At the same time, the third spring 173B positioned between the first sub-mover 181B and the third sub-mover 183B and the fifth spring 175B positioned between the third sub-mover 183B and the first stator 110B may also be compressed to generate a reaction force against a load applied to a control surface CS by an actuator 400.

In an embodiment, the first spring 171B, the third spring 173B, and the fifth spring 175B may have different elastic moduli. For example, the first spring 171B may have an elastic modulus k1, the third spring 173B may have an elastic modulus k3, and the fifth spring 175B may have an elastic modulus k5. Accordingly, when the main mover 140B presses the first spring 171B, the third spring 173B, and the fifth spring 175B with a force F, the total displacement δ satisfies δ1+δ3+δ5 (δ1=F/k1, δ3=F/k3, and δ5=F/k5).

When the main mover 140B presses the first sub-mover 181B and the third sub-mover 183B toward the first stator 110B, the second sub-mover 182B and the fourth sub-mover 184B do not move, and the displacement of the second spring 172A and the displacement of the fourth spring 174B do not change.

The fourth sub-mover 184B is disposed between the second stator 120B and the second sub-mover 182B, and moves along the linear guide 130B. The fourth sub-mover 184B has the same shape as or a different shape from the second sub-mover 182B, and the linear guide 130B passes through the fourth sub-mover 184B along the edge thereof and the fixed guide 160B passes through the inside of the fourth sub-mover 184B.

In an embodiment, the fourth sub-mover 184B may divide an area between the second sub-mover 182B and the second stator 120B. For example, the second sub-mover 182B, the fourth sub-mover 184B, and the second stator 120B may be sequentially disposed along the left side of the main mover 140B. Also, a second spring 172B may be disposed between the main mover 140B and the second sub-mover 182B, a fourth spring 174B may be disposed between the second sub-mover 182B and the fourth sub-mover 184B, and a sixth spring 176B may be disposed between the fourth sub-mover 184B and the second stator 120B.

The second spring 172B, the fourth spring 174B, and the sixth spring 176B are each wound around the outer circumferential surface of the movement guide 150B, and both ends of each spring may be free ends that are not fixed.

Figure 10:
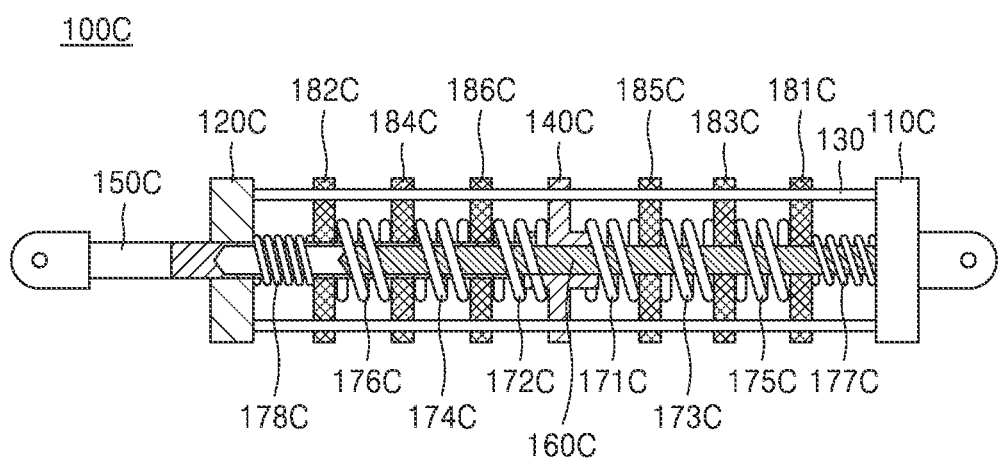
FIG. 10 illustrates a reaction force providing structure according to another embodiment of the present disclosure.

Accordingly, as shown in FIG. 10, when the movement guide 150B pulls the main mover 140B toward the second stator 120B, the second spring 172B positioned between the main mover 140B and the second sub-mover 182B is compressed while the main mover 140B moves along the movement guide 150B. At the same time, the fourth spring 174B positioned between the second sub-mover 182B and the fourth sub-mover 184B and the sixth spring 176B positioned between the fourth sub-mover 184B and the second stator 120B may also be compressed to generate a reaction force against a load applied to a control surface CS by an actuator 400.

In an embodiment, the second spring 172B, the fourth spring 174B, and the sixth spring 176B may have different elastic moduli. For example, the second spring 172B may have an elastic modulus k2, the fourth spring 174B may have an elastic modulus k4, and the sixth spring 176B may have an elastic modulus k6. Accordingly, when the main mover 140B presses the second spring 172B, the fourth spring 174B, and the sixth spring 176B with a force F, the total displacement δ satisfies δ2+δ4+δ6 (δ2=F/k2, δ4=F/k4, and δ6=F/k6).

When the main mover 140B pushes the second sub-mover 182B and the fourth sub-mover 184B toward the second stator 120B, the first sub-mover 181B and the third sub-mover 183B do not move, and the displacement of the first spring 171A and the displacement of the third spring 173B do not change.

In an embodiment, the first spring 171B and the second spring 172B may have the same elastic modulus, the third spring 173B and the fourth spring 174B may have the same elastic modulus, and the fifth spring 175B and the sixth spring 176B may have the same elastic modulus.

As such, the control surface load simulation apparatus 10 according to the present embodiment includes the reaction force providing structure 100B including a three-stage spring, and thus may more precisely provide a reaction force according to the displacement of the control surface CS. Therefore, the control surface load simulation apparatus 10 may more precisely simulate a load applied to the control surface CS.

FIG. 10 illustrates a reaction force providing structure 100C according to another embodiment of the present disclosure.

The control surface load simulation apparatus 10 according to the present embodiment may include the reaction force providing structure 100C. The reaction force providing structure 100C may further include a plurality of sub-movers and springs, as compared to the reaction force providing structure 100B according to the above-described embodiment. Other components of the reaction force providing structure 100C may be the same as other components of the reaction force providing structure 100B, and detailed descriptions thereof are omitted.

As shown in FIG. 10, the reaction force providing structure 100C according to the present embodiment may further include a fifth sub-mover 185C, a sixth sub-mover 186C, a seventh spring 177C, and an eighth spring 178C.

The fifth sub-mover 185C, a third sub-mover 183C, and a first sub-mover 181C are sequentially disposed toward the right with a main mover 140C in the center. Also, a first spring 171C is disposed between the main mover 140C and the fifth sub-mover 185C, a third spring 173C is disposed between the fifth sub-mover 185C and the third sub-mover 183C, a fifth spring 175C is disposed between the third sub-mover 183C and a first sub-mover 181C, and the seventh spring 177C is disposed between the first sub-mover 181C and a first stator 110C.

Also, the sixth sub-mover 186C, a fourth sub-mover 184C, and a second sub-mover 182C are sequentially disposed toward the left with the main mover 140C in the center. Also, the second spring 172C may be disposed between the main mover 140C and the sixth sub-mover 186C, a fourth spring 174C may be disposed between the sixth sub-mover 186C and the fourth sub-mover 184C, a sixth spring 176C may be disposed between the fourth sub-mover 184C and the second sub-mover 182C, and the eighth spring 178C may be disposed between the second sub-mover 182C and a second stator 120C.

The operating state of the reaction force providing structure 100C is similar to those of the reaction force providing structures 100, 100A, and 100B, and detailed descriptions thereof are omitted.

That is, when displacement occurs in the control surface CS and the movement guide 150C presses the main mover 140C toward the first stator 110C, the first sub-mover 181C, the third sub-mover 183C, and the fifth sub-mover 185C moves to the right and the first spring 171C, the third spring 173C, the fifth spring 175C, and the seventh spring 177C are compressed to form a reaction force.

In this case, both ends of each of the second spring 172C, the fourth spring 174C, the sixth spring 176C, and the eighth spring 178C are not fixed, and displacement does not occur.

Also, when the movement guide 150C pulls the main mover 140C toward the second stator 120C, the second sub-mover 182C, the fourth sub-mover 184C, and the sixth sub-mover 186C move to the left and the second spring 172C, the fourth spring 174C, the sixth spring 176C, and the eighth spring 178C are compressed to form a reaction force.

In this case, both ends of each of the first spring 171C, the third spring 173C, the fifth spring 175C, and the seventh spring 177C are not fixed, and displacement does not occur.

In an embodiment, the first spring 171C to the eighth spring 178C may have different elastic moduli k1 to k8, respectively.

As described above, the control surface load simulation apparatus 10 according to the present embodiment includes the reaction force providing structure 100C including a four-stage spring, and thus may more precisely provide a reaction force according to the displacement of the control surface CS. Therefore, the control surface load simulation apparatus 10 may more precisely simulate a load applied to the control surface CS.

Although not shown in the drawings, the control surface load simulation apparatus 10 according to an embodiment of the present disclosure may include a reaction force providing structure including five or more springs. Alternatively, the control surface load simulation apparatus 10 according to an embodiment of the present disclosure may include a reaction force providing structure in which a plurality of springs are connected in parallel.

The control surface load simulation apparatus according to an embodiment of the present disclosure may simulate a load applied to a control surface by using only one actuator.

The control surface load simulation apparatus according to an embodiment of the present disclosure includes a reaction force providing structure that generates a reaction force with respect to a load applied by one actuator to a control surface, and thus, there is no need to synchronize the timings and magnitudes of loads applied by a plurality of actuators. In addition, the reaction force providing structure including a plurality of springs may generate a reaction force while responding immediately according to the displacement of the control surface.

The control surface load simulation apparatus according to an embodiment of the present disclosure may accurately simulate a control surface load even with a relatively simple configuration, and maintenance and repair of the control surface load simulation apparatus are very easy.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

Specific technical content described in the embodiment is an embodiment and does not limit the technical scope of the embodiment. In order to concisely and clearly describe the description of the present disclosure, descriptions of conventional general techniques and configurations may be omitted. In addition, the connection or connection member of the lines between the components shown in the drawings illustratively shows functional connections and/or physical or circuit connections, and in an actual device, various functional connections, physical connections that are replaceable or additional It may be expressed as a connection, or circuit connections. In addition, unless there is a specific reference such as "essential" or "importantly", it may not be a necessary component for the application of the present disclosure.

The use of the terms "a" and "an" and "the" and similar referents in the detailed description and the claims are to be construed to cover both the singular and the plural, unless specifically defined otherwise. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The embodiments are not limited to the above-described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to those skilled in this art without departing from the spirit and scope of the present disclosure.

What is claimed is:

1. A control surface load simulation apparatus comprising:
    a first support surface;
    a second support surface apart from the first support surface in a height direction;
    a control surface located between the first support surface and the second support surface;
    an actuator connected to the second support surface and configured to apply a predetermined load to the control surface; and
    a reaction force providing structure connected to the first support surface and the control surface to be movable relative to the first support surface and the control surface, the reaction force providing structure being configured to apply a reaction force corresponding to the load to the control surface,
    wherein the reaction force providing structure includes:
        a first stator rotatably connected to the first support surface;
        a second stator disposed apart from the first stator;
        at least one linear guide located between the first stator and the second stator;
        a main mover configured to move along the at least one linear guide;
        a movement guide connected to the control surface and the main mover to move the main mover according to displacement of the control surface;
        a fixed guide having one end fixed to the first stator and the other end inserted into the movement guide;
        a first spring on an outer circumferential surface of the fixed guide; and
        a second spring on an outer circumferential surface of the movement guide, and
    wherein the control surface is rotatable about a hinge axis, and a central axis of the actuator and a central axis of the reaction force providing structure are spaced apart from the hinge axis and eccentric to each other; and
    wherein the fixed quide is configured to pass through the main mover and is inserted into an inner space of the movement quide, which is hollow.

2. The control surface load simulation apparatus of claim 1, wherein the movement guide has one end rotatably connected to the control surface and the other end connected to the main mover, and is configured to pass through the second stator.

3. The control surface load simulation apparatus of claim 1, wherein, when the movement guide presses the main mover toward the first stator, the first spring is compressed and the second spring is not compressed or tensioned, and when the movement guide presses the main mover toward the second stator, the first spring is in a free state and the second spring is not compressed or tensioned.

* * * * *